(12) United States Patent
Brown

(10) Patent No.: US 8,463,853 B2
(45) Date of Patent: *Jun. 11, 2013

(54) DUPLICATING DIGITAL STREAMS FOR DIGITAL CONFERENCING USING SWITCHING TECHNOLOGIES

(75) Inventor: Scott K. Brown, Sterling, VA (US)

(73) Assignee: Facebook, Inc., Menlo Park, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/053,903

(22) Filed: Mar. 22, 2011

(65) Prior Publication Data

US 2011/0211495 A1 Sep. 1, 2011

Related U.S. Application Data

(63) Continuation of application No. 11/549,934, filed on Oct. 16, 2006, now Pat. No. 7,921,157, which is a continuation of application No. 10/134,439, filed on Apr. 30, 2002, now Pat. No. 7,124,166.

(60) Provisional application No. 60/286,964, filed on Apr. 30, 2001, provisional application No. 60/343,182, filed on Dec. 31, 2001.

(51) Int. Cl.
*G06F 15/16* (2006.01)

(52) U.S. Cl.
USPC ........... 709/204; 709/205; 709/231; 709/238; 709/244; 709/245; 370/260; 370/390; 370/261

(58) Field of Classification Search
USPC .................. 370/260, 261, 390; 709/231, 204, 709/205, 238, 244, 245; 725/115
See application file for complete search history.

(56) References Cited

U.S. PATENT DOCUMENTS

| 4,872,160 A | 10/1989 | Hemmady et al. |
| 5,283,639 A | 2/1994 | Esch et al. |

(Continued)

FOREIGN PATENT DOCUMENTS

| EP | 1063814 | 12/2000 |
| GB | 2309849 | 2/1996 |

(Continued)

OTHER PUBLICATIONS

Lockwood et al., Reprogrammable Network Packet Processing on the Field Programmable Port Extender (PFX), 2001, St. Louis, Missouri.

(Continued)

*Primary Examiner* — Carl Colin
*Assistant Examiner* — Mohammad A Siddiqi
(74) *Attorney, Agent, or Firm* — Keller Jolley Preece

(57) ABSTRACT

Using switching technologies to duplicate packets of a digital stream (e.g., digital video stream) sent from one workstation to multiple recipient workstations, where the switching technologies enable the multiple streams sent from the switch to the recipient workstations to be generated from a single digital stream sent from the sending workstation to the switch. Data units, such as video data units, may be transmitted by using a switch to enable receipt of a stream of data units including a payload portion and an attribute portion from at least two conferencing participants. The switch is used to duplicate at least a subportion of the payload portion of a data unit within the stream of data units, and to enable access to the duplicated subportion of the data unit by two or more conferencing participants.

21 Claims, 6 Drawing Sheets

U.S. PATENT DOCUMENTS

| | | | |
|---|---|---|---|
| 5,493,568 | A | 2/1996 | Sampat et al. |
| 5,583,561 | A | 12/1996 | Baker et al. |
| 5,600,646 | A | 2/1997 | Polomski |
| 5,604,542 | A | 2/1997 | Dedrick |
| 5,682,597 | A | 10/1997 | Ganek et al. |
| 5,689,641 | A | 11/1997 | Ludwig et al. |
| 5,742,597 | A | 4/1998 | Holt et al. |
| 5,774,660 | A | 6/1998 | Brendel et al. |
| 5,778,187 | A | 7/1998 | Monteiro et al. |
| 5,799,002 | A | 8/1998 | Krishnan |
| 5,802,301 | A | 9/1998 | Dan et al. |
| 5,809,237 | A | 9/1998 | Watts et al. |
| 5,815,662 | A | 9/1998 | Ong |
| 5,838,912 | A | 11/1998 | Poon et al. |
| 5,841,763 | A | 11/1998 | Leondires et al. |
| 5,867,502 | A | 2/1999 | Chang |
| 5,872,588 | A | 2/1999 | Aras et al. |
| 5,913,062 | A | 6/1999 | Vrvilo et al. |
| 5,935,245 | A | 8/1999 | Sherer |
| 5,946,614 | A | 8/1999 | Robbins et al. |
| 5,973,722 | A | 10/1999 | Wakai et al. |
| 5,983,005 | A | 11/1999 | Monteiro et al. |
| 6,011,782 | A | 1/2000 | DeSimone et al. |
| 6,052,805 | A | 4/2000 | Chen et al. |
| 6,061,349 | A | 5/2000 | Coile et al. |
| 6,061,504 | A | 5/2000 | Tzelnic et al. |
| 6,097,720 | A | 8/2000 | Araujo et al. |
| 6,101,187 | A | 8/2000 | Cukier et al. |
| 6,115,752 | A | 9/2000 | Chauhan |
| 6,119,163 | A | 9/2000 | Monteiro et al. |
| 6,141,336 | A | 10/2000 | Bauchot et al. |
| 6,151,621 | A | 11/2000 | Colyer et al. |
| 6,151,632 | A | 11/2000 | Chaddha et al. |
| 6,157,635 | A | 12/2000 | Wang et al. |
| 6,173,314 | B1 | 1/2001 | Kurashima et al. |
| 6,189,039 | B1 | 2/2001 | Harvey et al. |
| 6,195,680 | B1 | 2/2001 | Goldszmidt et al. |
| 6,201,859 | B1 | 3/2001 | Memhard et al. |
| 6,226,686 | B1 | 5/2001 | Rothschild et al. |
| 6,259,701 | B1 | 7/2001 | Shur et al. |
| 6,266,335 | B1 | 7/2001 | Bhaskaran |
| 6,298,129 | B1 | 10/2001 | Culver et al. |
| 6,314,464 | B1 | 11/2001 | Murata et al. |
| 6,327,622 | B1 | 12/2001 | Jindal et al. |
| 6,347,090 | B1 * | 2/2002 | Ooms et al. ............ 370/428 |
| 6,363,075 | B1 | 3/2002 | Huang et al. |
| 6,363,429 | B1 | 3/2002 | Ketcham |
| 6,370,112 | B1 | 4/2002 | Voelker |
| 6,377,996 | B1 | 4/2002 | Lumelsky et al. |
| 6,381,746 | B1 | 4/2002 | Urry |
| 6,389,462 | B1 | 5/2002 | Cohen et al. |
| 6,404,745 | B1 | 6/2002 | O'Neil et al. |
| 6,415,312 | B1 | 7/2002 | Boivie |
| 6,415,323 | B1 | 7/2002 | McCanne et al. |
| 6,418,214 | B1 | 7/2002 | Smythe et al. |
| 6,434,622 | B1 | 8/2002 | Monteiro et al. |
| 6,437,830 | B1 | 8/2002 | Horlander |
| 6,457,043 | B1 | 9/2002 | Kwak et al. |
| 6,466,550 | B1 | 10/2002 | Foster et al. |
| 6,490,285 | B2 | 12/2002 | Lee et al. |
| 6,490,320 | B1 | 12/2002 | Vetro et al. |
| 6,510,553 | B1 | 1/2003 | Hazra |
| 6,516,350 | B1 | 2/2003 | Lumelsky et al. |
| 6,625,773 | B1 | 9/2003 | Boivie et al. |
| 6,646,997 | B1 | 11/2003 | Baxley et al. |
| 6,665,726 | B1 * | 12/2003 | Leighton et al. ............ 709/231 |
| 6,708,213 | B1 | 3/2004 | Bommaiah et al. |
| 6,711,212 | B1 | 3/2004 | Lin |
| 6,728,356 | B1 | 4/2004 | Carroll |
| 6,728,784 | B1 | 4/2004 | Mattaway |
| 6,751,219 | B1 | 6/2004 | Lipp et al. |
| 6,785,704 | B1 | 8/2004 | McCanne |
| 6,826,185 | B1 | 11/2004 | Montanaro et al. |
| 6,847,618 | B2 | 1/2005 | Laursen et al. |
| 6,850,707 | B1 | 2/2005 | Chang et al. |
| 6,873,627 | B1 | 3/2005 | Miller et al. |
| 6,879,565 | B2 | 4/2005 | Baxley et al. |
| 6,889,385 | B1 * | 5/2005 | Rakib et al. ............ 725/119 |
| 6,891,828 | B2 * | 5/2005 | Ngai ............ 370/357 |
| 6,910,078 | B1 | 6/2005 | Raman et al. |
| 6,996,102 | B2 | 2/2006 | Pegrum et al. |
| 7,016,351 | B1 | 3/2006 | Farinacci et al. |
| 7,054,949 | B2 | 5/2006 | Jennings |
| 7,072,972 | B2 | 7/2006 | Chin et al. |
| 7,124,166 | B2 | 10/2006 | Brown |
| 7,133,922 | B1 | 11/2006 | She et al. |
| 7,187,690 | B2 | 3/2007 | Taylor |
| 7,237,033 | B2 | 6/2007 | Weigand et al. |
| 7,266,609 | B2 | 9/2007 | Bill et al. |
| 7,292,571 | B2 | 11/2007 | Brown |
| 7,299,291 | B1 | 11/2007 | Shaw |
| 7,430,609 | B2 | 9/2008 | Brown et al. |
| 7,694,013 | B2 | 4/2010 | Weigand et al. |
| 7,921,157 | B2 | 4/2011 | Brown |
| 8,224,991 | B2 | 7/2012 | Weigand |
| 2001/0044851 | A1 | 11/2001 | Rothman et al. |
| 2001/0048662 | A1 | 12/2001 | Suzuki et al. |
| 2002/0024956 | A1 | 2/2002 | Keller-Tuberg |
| 2002/0026482 | A1 | 2/2002 | Morishige et al. |
| 2002/0031126 | A1 | 3/2002 | Crichton et al. |
| 2002/0065922 | A1 | 5/2002 | Shastri |
| 2002/0093963 | A1 | 7/2002 | Roullet et al. |
| 2002/0103864 | A1 | 8/2002 | Rodman et al. |
| 2002/0112004 | A1 | 8/2002 | Reid et al. |
| 2002/0112069 | A1 | 8/2002 | Sim |
| 2002/0114302 | A1 | 8/2002 | McDonald et al. |
| 2002/0116532 | A1 | 8/2002 | Berg |
| 2002/0131400 | A1 | 9/2002 | Tinsley et al. |
| 2002/0161910 | A1 | 10/2002 | Bill et al. |
| 2002/0191543 | A1 | 12/2002 | Buskirk et al. |
| 2003/0061278 | A1 | 3/2003 | Agarwalla et al. |
| 2003/0067934 | A1 | 4/2003 | Hooper et al. |
| 2003/0099202 | A1 | 5/2003 | Lear et al. |
| 2003/0126197 | A1 | 7/2003 | Black et al. |
| 2003/0145038 | A1 | 7/2003 | Bin Tariq et al. |
| 2004/0025186 | A1 | 2/2004 | Jennings et al. |
| 2005/0010653 | A1 | 1/2005 | McCanne |
| 2006/0248231 | A1 | 11/2006 | O'Rourke et al. |
| 2007/0288639 | A1 | 12/2007 | Brown |
| 2008/0049723 | A1 | 2/2008 | Bill et al. |
| 2008/0140851 | A1 | 6/2008 | Weigand et al. |
| 2010/0185778 | A1 | 7/2010 | Weigand et al. |

FOREIGN PATENT DOCUMENTS

| | | |
|---|---|---|
| JP | 08-320800 | 12/1996 |
| JP | 9270793 | 10/1997 |
| JP | 11-232201 | 8/1999 |
| JP | 11-261580 | 9/1999 |
| JP | 2000-010895 | 1/2000 |
| JP | 2000-029813 | 1/2000 |
| JP | 2000-172618 | 6/2000 |
| JP | 2001-508258 | 6/2000 |
| WO | WO 9638961 A | 5/1996 |
| WO | 98/31107 | 7/1998 |
| WO | 99/27741 | 6/1999 |
| WO | 00/28713 | 5/2000 |
| WO | 00/65775 | 11/2000 |
| WO | 00/65776 | 11/2000 |
| WO | 00/69101 | 11/2000 |

OTHER PUBLICATIONS

Taylor et al., Dynamic Hardware Plugins (DHP): Exploiting Reconfigurable Hardware for High-Performance Programmable Routers, 2002, St. Louis, Missouri.

Choi et al., Design of a Flexible Open Platform for High Performance Active Networks, 1999, St. Louis, Missouri.

International Search Report dated Jul. 2, 2003 (Appln. No. PCT/US03/12086).

F. Gong: Multipoint audio and video control for packetpbased multimedia conferencing (1994), International Multimedia Conference, pp. 425-432, ISBN: 0-89791-686-7.

Keller et al., An Active Router Architecture for Multicast Video Distribution, St. Louis, Missouri.

Australian Office Action issued in 200205256 of Feb. 9, 2007.

Australian Office Action issued in 200205256 on May 26, 2008.

Canadian Intellectual Property Office, Office Action of Jan. 19, 2011, App No. 2,445,869 (3 pages).
Chinese Office Action Issued in 02810728.4 on Feb. 29, 2008.
Chinese Office Action Issued in 02810728.4 on Jul. 13, 2007.
Chinese Office Action Issued in 02810728.4 on Jun. 23, 2006.
European Office Action issued in EP02725839.1 on Apr. 16, 2009, 5 Pages.
Examination Report for European Application No. 02734066.0, mailed Apr. 16, 2009.
Furht, B. et al., "IP Simulcast: A New Technique for Multimedia Broadcasting Over the Internet", Cit Journal of Computing and Information Technology, Azgreb, HR, vol. 6, No. 3, Sep. 1, 1998, pp. 245-254, XP000870379, ISSN: 1330-1136.
Indian Office Action Issue din 1764/DELNP/2003 on Apr. 16, 2008.
Office Action for Japanese Application No. 2002-586120 dated Oct. 10, 2008, 1 page.
ST2 Working Group L. Degrossi & L. Berger et al.., "Internet Stream Protocol V Cersion 3 (ST2) Protocol Specification—Version ST2+' rfc1819.txt." IETF Standard Internet Engineering Task Force, IETF, CH, Aug. 1, 1995, XP015007606 ISSN: 0000-003, Chapter 1 pp. 6-19.
Supplemental European Search Report Issued in EP 02734066.0 on Jul. 31, 2006.
The Patent Office of the People's Republic of China, Office Action, Chinese App No. 02810729.2 mailed on Aug. 12, 2005. (13 Pages).
The Patent Office of the People's Republic of China, Office Action, Chinese App No. 02810729.2 mailed on May 30, 2008 (9 Pages).
The Patent Office of the People's Republic of China, Office Action, Chinese App No. 02810729.2 mailed on Nov. 2, 2007 (10 Pages).
Oh-ishi, Tetsuya, et al. "Contents Delivery Function over Managed Network," IEICE Technical Report, vol. 101, No. 120, Jun. 14, 2001.
U.S. Appl. No. 09/893,692, Dec. 23, 2004, Office Action.
U.S. Appl. No. 09/893,692, Sep. 14, 2005, Notice of Allowance.
U.S. Appl. No. 09/893,692, Mar. 28, 2007, Notice of Allowance.
U.S. Appl. No. 11/848,430, Aug. 8, 2011, Office Action.
U.S. Appl. No. 11/848,430, Jan. 6, 2012, Notice of Allowance.
U.S. Appl. No. 10/134,439, Jul. 25, 2005, Office Action.
U.S. Appl. No. 10/134,439, Jun. 12, 2006, Notice of Allowance.
U.S. Appl. No. 11/549,934, Sep. 4, 2009, Office Action.
U.S. Appl. No. 11/549,934, Apr. 28, 2010, Office Action.
U.S. Appl. No. 11/549,934, Nov. 29, 2010, Notice of Allowance.
U.S. Appl. No. 10/090,727, May 10, 2005, Office Action.
U.S. Appl. No. 10/090,727, Jan. 3, 2007, Notice of Allowance.
U.S. Appl. No. 11/754,661, Jun. 19, 2009, Office Action.
U.S. Appl. No. 11/754,661, Nov. 18, 2009, Notice of Allowance.
U.S. Appl. No. 12/732,929, Oct. 7, 2010, Office Action.
U.S. Appl. No. 12/732,929, Mar. 18, 2011, Notice of Allowance.
U.S. Appl. No. 13/173,290, Jan. 3, 2012, Office Action.
U.S. Appl. No. 13/173,290, Mar. 16, 2012, Notice of Allowance.
U.S. Appl. No. 10/134,552, Oct. 11, 2005, Office Action.
U.S. Appl. No. 10/134,552, May 24, 2006, Office Action.
U.S. Appl. No. 10/134,552, Aug. 8, 2006, Office Action.
U.S. Appl. No. 10/134,552, Mar. 5, 2007, Office Action.
U.S. Appl. No. 10/134,552, Sep. 11, 2007, Office Action.
U.S. Appl. No. 10/134,552, Apr. 4, 2008, Notice of Allowance.
U.S. Appl. No. 10/157,909, Aug. 9, 2006, Office Action.
U.S. Appl. No. 10/157,909, Jan. 30, 2007, Notice of Allowance.
U.S. Appl. No. 11/761,050, Jul. 27, 2009, Office Action.
U.S. Appl. No. 11/761,050, Feb. 3, 2010, Office Action.
U.S. Appl. No. 11/761,050, Jul. 6, 2011, Notice of Allowance.
U.S. Appl. No. 11/761,050, Oct. 21, 2011, Notice of Allowance.

* cited by examiner

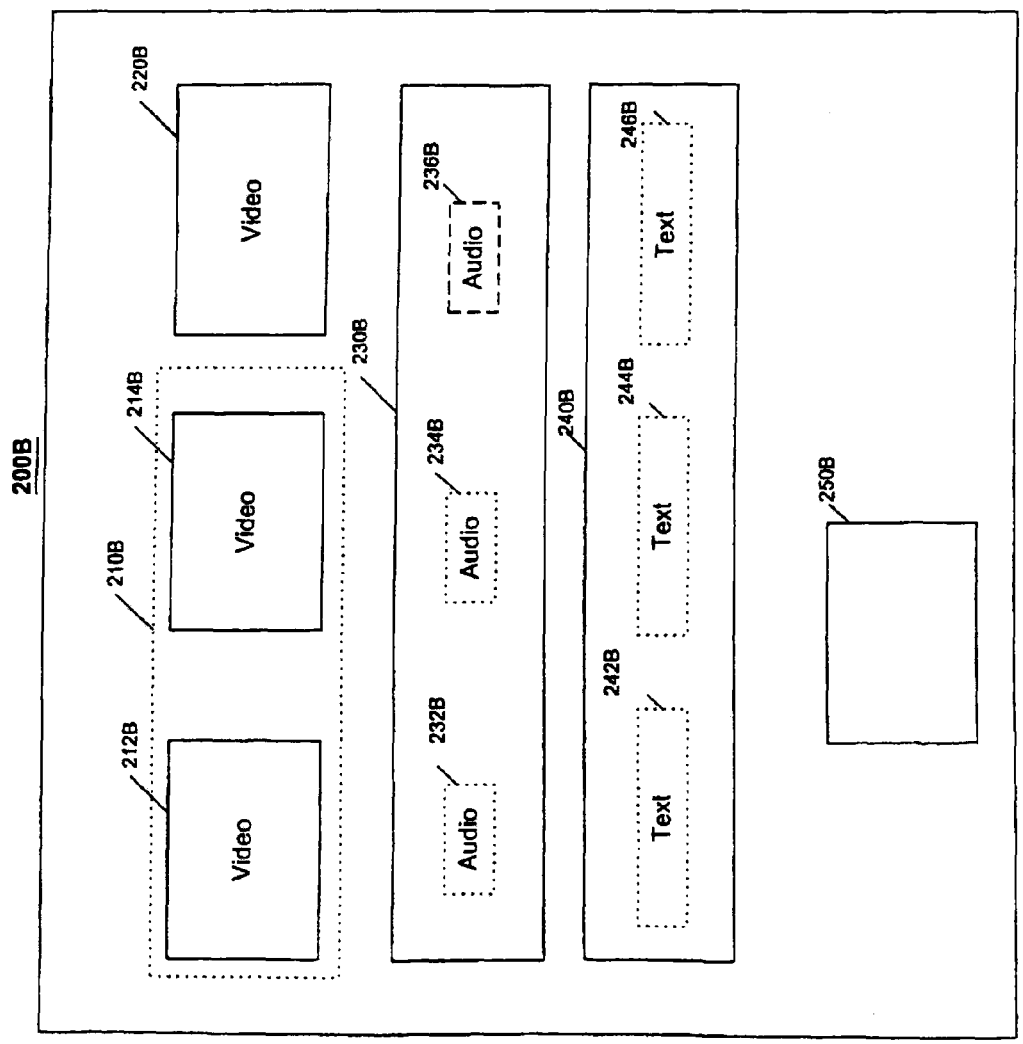

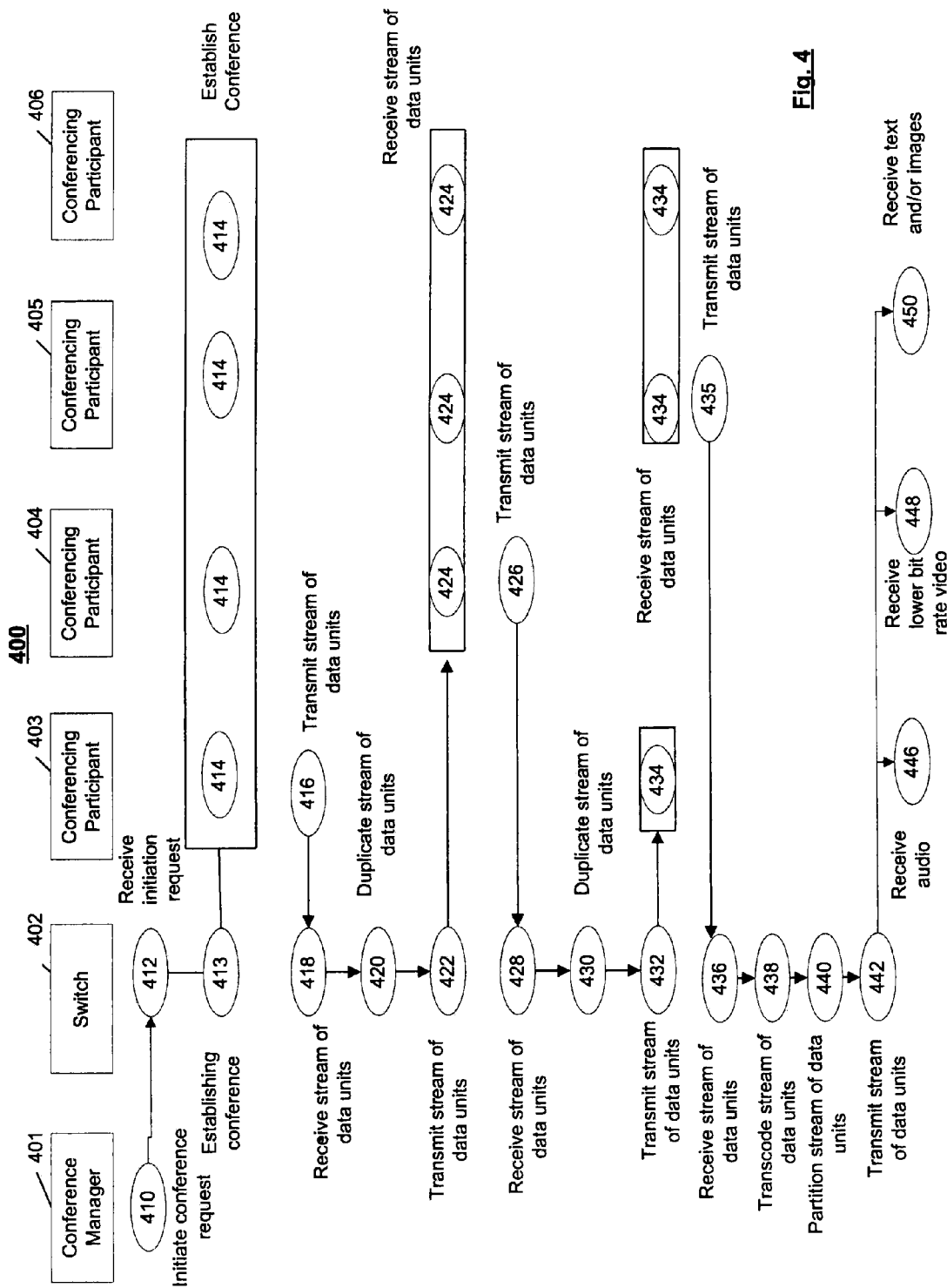

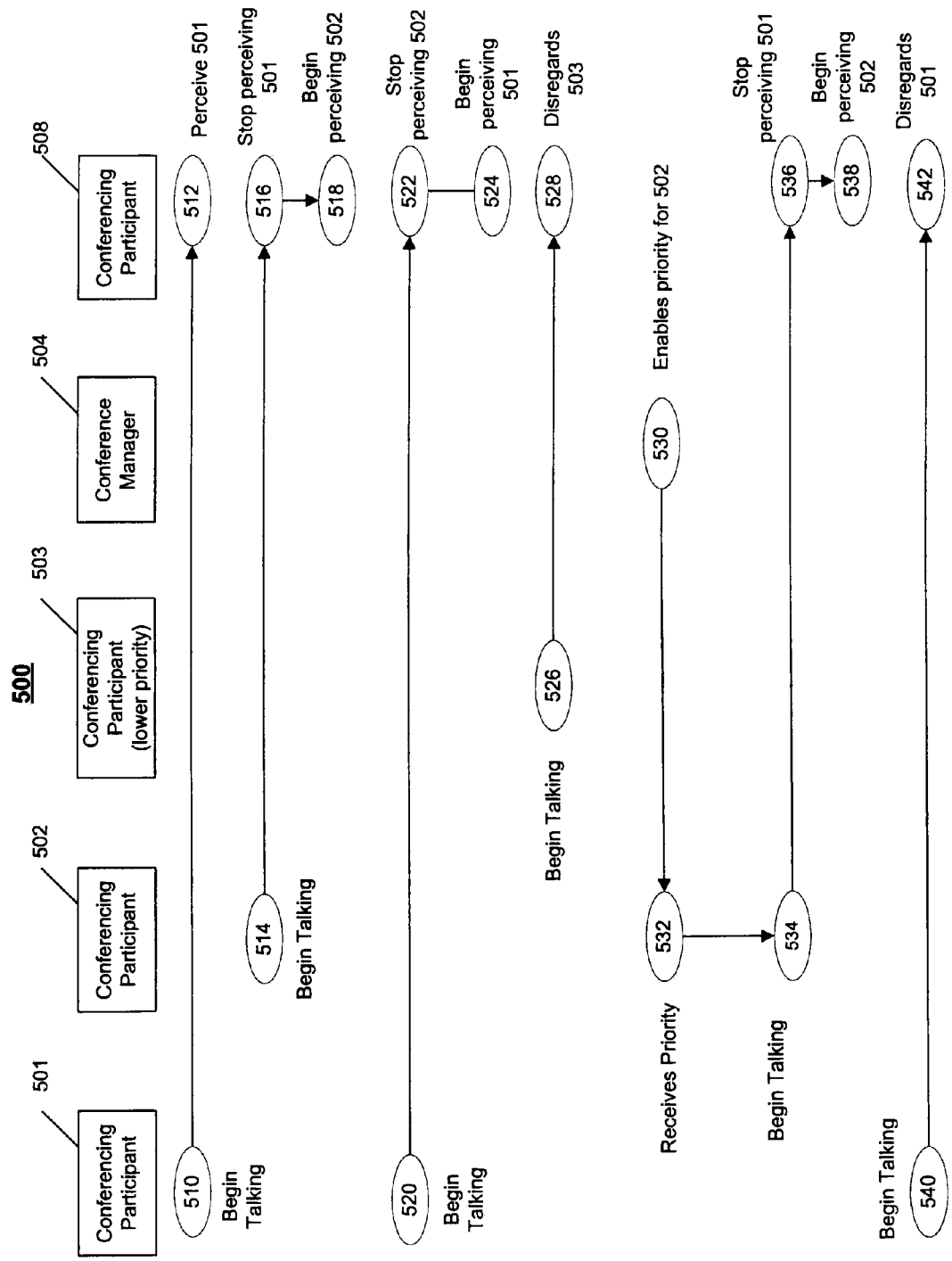

DUPLICATING DIGITAL STREAMS FOR DIGITAL CONFERENCING USING SWITCHING TECHNOLOGIES

CROSS-REFERENCE TO RELATED APPLICATIONS

This application is a continuation of U.S. patent application Ser. No. 11/549,934, filed on Oct. 16, 2006 now U.S. Pat. No. 7,921,157, and titled "DUPLICATING DIGITAL STREAMS FOR DIGITAL CONFERENCING USING SWITCHING TECHNOLOGIES", which is a continuation of U.S. patent application Ser. No. 10/134,439, filed on Apr. 30, 2002 now U.S. Pat. No. 7,124,166, and titled "DUPLICATING DIGITAL STREAMS FOR DIGITAL CONFERENCING USING SWITCHING TECHNOLOGIES," that claims the benefit of U.S. Provisional Application No. 60/286,964, filed Apr. 30, 2001 and titled "GENERATING MULTIPLE DATA STREAMS FROM A SINGLE DATA SOURCE"; U.S. Provisional Application No. 60/343,182, filed Dec. 31, 2001 and titled "DUPLICATING DIGITAL STREAMS FOR DIGITAL CONFERENCING USING SWITCHING TECHNOLOGIES"; and U.S. application Ser. No. 09/893,692, filed Jun. 29, 2001 and titled "GENERATING MULTIPLE DATA STREAMS FROM A SINGLE DATA SOURCE," each of which is incorporated by reference.

TECHNICAL FIELD

The following description relates to using switching technologies to stream media in digital conferencing applications.

BACKGROUND

Video conferencing generally describes a process whereby conferencing participants can communicate remotely with one another through the use of video equipment that typically includes some form of camera and a video display. Increased usage of the Internet has resulted in an increased demand for video conferencing and a corresponding need for cost effective multimedia communications solutions.

SUMMARY

In one general aspect, data units may be transmitted by using a switch to receive from at least two conferencing participants a stream of data units that each include a payload portion and an attribute portion. The switch duplicates at least a subportion of the payload portion of a data unit within the stream of data units, and enables access to the duplicated subportion of the data unit by two or more conferencing participants.

In another general aspect, a conferencing participant may participate in an electronic conference by interfacing with a network that includes a switch that duplicates the stream of data units sent by two or more conferencing participants and makes the duplicated stream of data units accessible to more than one conferencing participant. The streams are received from the switch, with each stream including a payload portion that has been duplicated by the switch and an attribute portion that has been transmitted by more than one other conferencing participant.

In another general aspect, a conferencing participant participates in an electronic conference by interfacing with a network that includes one or more switches capable of duplicating at least a payload portion of a data unit within a stream of data units. The conferencing participant transmits the stream of data units to the switches for duplication of at least the payload portion for transmission to two or more conferencing participants.

In another general aspect, a conferencing participant participates in an electronic conference by interfacing with a network that includes a switch capable of duplicating a stream. The participant transmits a stream to the switch and receives duplicated streams from the switch.

Implementations may include one or more of the following features. For example, the data unit may include an Internet Protocol packet. The attribute portion of the data unit may include an Internet Protocol header, or one or more pieces of layer three information.

Implementations may include using the switch to generate and associate different attribute portions with duplicates of the payload portion generated by the switch. Using the switch to duplicate at least the payload portion may include duplicating only the payload portion of the data unit. Using the switch to associate different attribute portions with the data unit and duplicates of the payload portion may include specifying destination information that differs among the duplicates of the payload portion. Using the switch to generate and associate different attribute portions may include changing an IP destination address. Changing the IP destination address may include changing the IP destination address to an IP address corresponding to one or more conferencing participants to which access to the payload portion will be enabled.

Using the switch to duplicate may include using the switch to duplicate the payload portion and the attribute portion. The switch may enable the conferencing participants to access duplicated subportions of data units in response to receiving a request to access the stream of data units. The request may be received from at least a requesting one of the two or more conferencing participants, or from a device other than the conferencing participants.

Using the switch to enable access to the duplicated subportions of the data unit may include transmitting two or more duplicated subportions to two or more conferencing participants using the switch. Using the switch to enable access to the duplicated subportions of the data unit by two or more conferencing participants may include transmitting two or more duplicated subportions from a transmitting participant to all of the conferencing participants using the switch, or from all of the conferencing participants to all of the conferencing participants using the switch. Transmitting two or more duplicated subportions from all of the conferencing participants to all of the conferencing participants may include enabling the switch to filter an originating stream so that a stream of data units from an originating conferencing participant is not transmitted back to the originating conferencing participant.

Implementations may include partitioning content from a stream that includes a combination of a forwarded signal and a filtered signal. The forwarded signal may differ from the filtered signal. For example, the underlying media format may be transcoded to a different bit rate.

Implementations may include determining whether one of the conferencing participants is attempting to actively participate. Using the switch to enable access to the duplicated subportions of the data unit by two or more conferencing participants may include enabling access to the streams of the conferencing participants attempting to actively participate most recently. The streams of conferencing participants that have not attempted to actively participate may not be duplicated.

Using the switch to enable access to the duplicated subportions may include prioritizing conferencing participants to determine which streams of the conferencing participants are duplicated. Access to the streams of conferencing participants with higher priorities may be enabled before enabling access to the data streams of conferencing participants with lower priorities. A priority for a participant may be specified by one of a service provider, a conference organizer, or a conference manager.

Using a switch to enable access to the duplicated subportion of the data unit by two or more conferencing participants may include using the conference manager to designate which of the conferencing participants' data streams are enabled to be accessed. Perceivable output may be displayed based on the stream of data units.

The details of one or more implementations are set forth in the accompanying drawings and the descriptions below. Other features and advantages will be apparent from the description and drawings, and from the claims.

DESCRIPTION OF DRAWINGS

FIG. 2B is a block diagram illustrating an exemplary display used to make known and/or available the conferencing applications described with respect to FIG. 2A.

FIG. 4 is a flow chart illustrating the operation of a switch in duplicating at least a subportion of a data unit in a stream of data units and enabling conferencing participants to access the duplicated subportion of the stream of data units.

FIG. 5 is a diagram illustrating the operation of a conferencing participant in prioritizing among several duplicated streams of data units for display.

Like reference symbols in the various drawings indicate like elements.

DETAILED DESCRIPTION

In general, switching technologies may be used to duplicate packets in a digital conference (e.g., digital video stream) sent from one workstation as part of an electronic conference. The switching technologies enable the multiple streams sent from the switch to the recipient workstations to be generated from a single digital stream sent from the sending workstation to the switch. Thus, a terminal participating in the conference does not need to transmit a stream for each participant.

Figure 1:
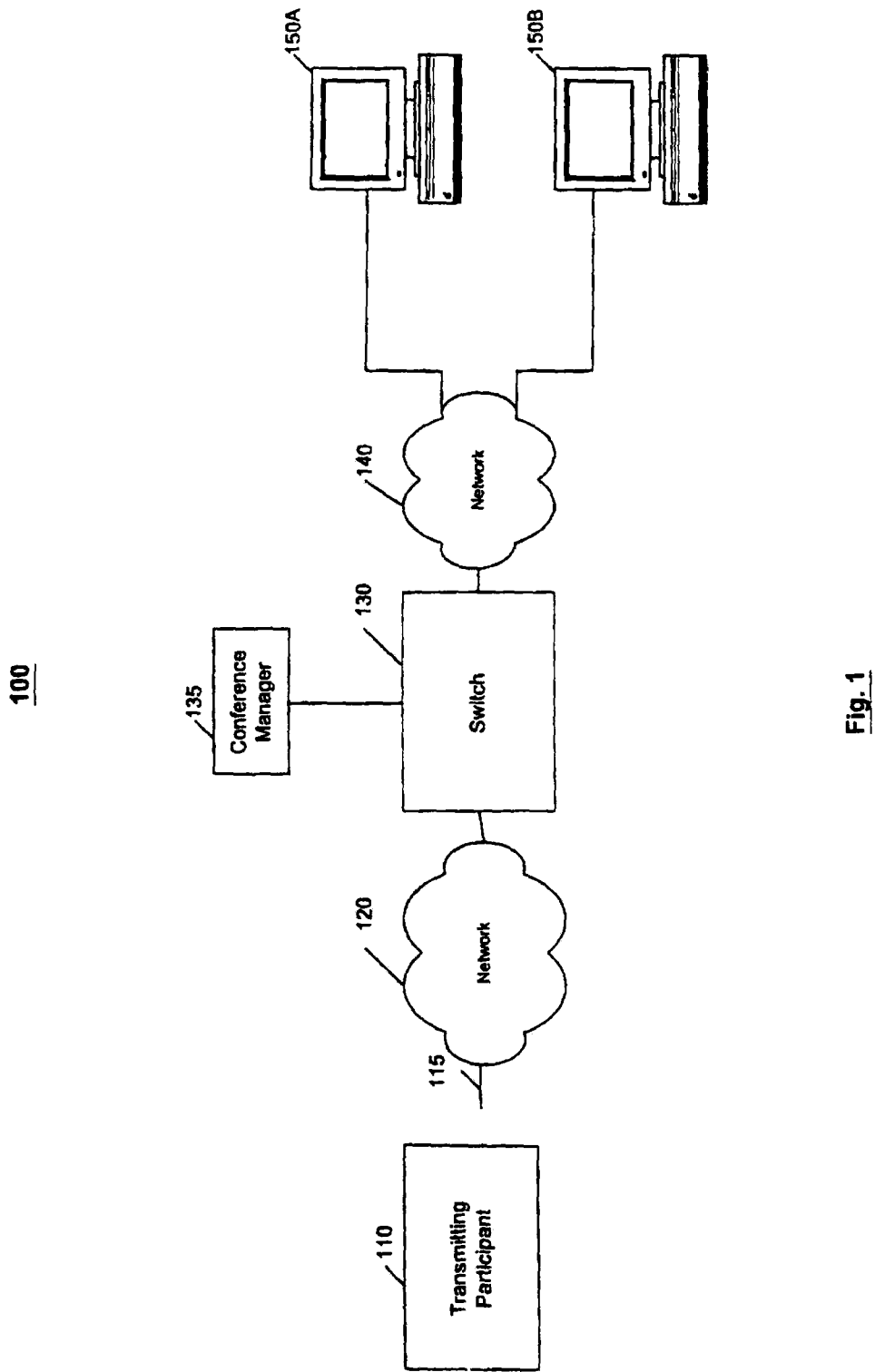
FIG. 1 is a block diagram illustrating a communications system that uses a switch to duplicate digital streams and enable digital conferencing among multiple conferencing participants.
Figure 2A:
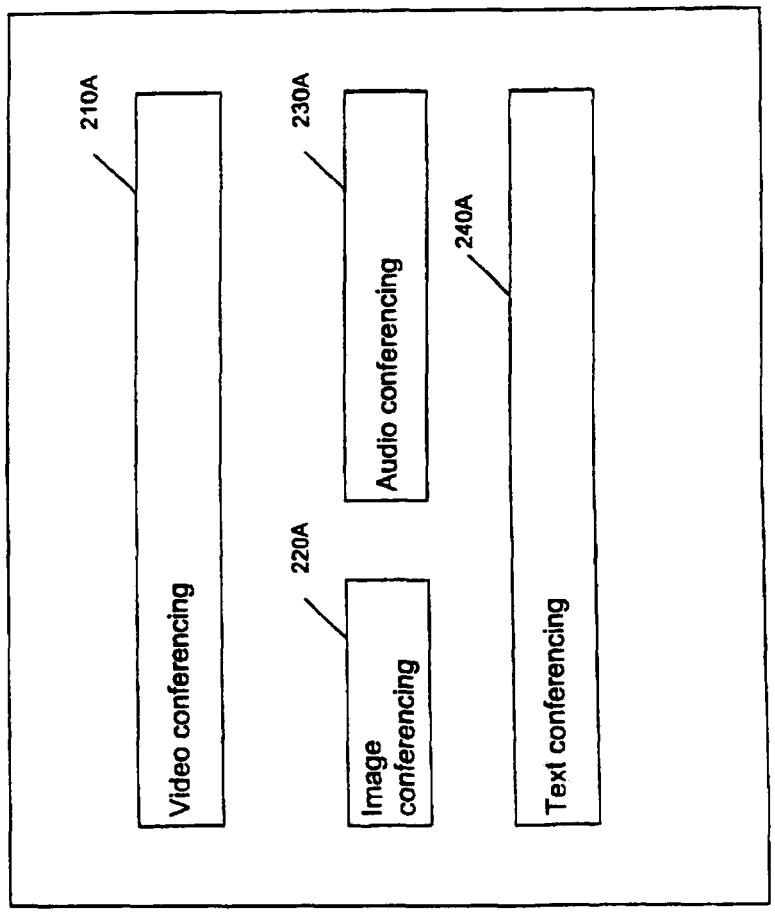
FIG. 2A is a block diagram illustrating several conferencing applications that may be available to an exemplary conferencing participant.
Figure 3:
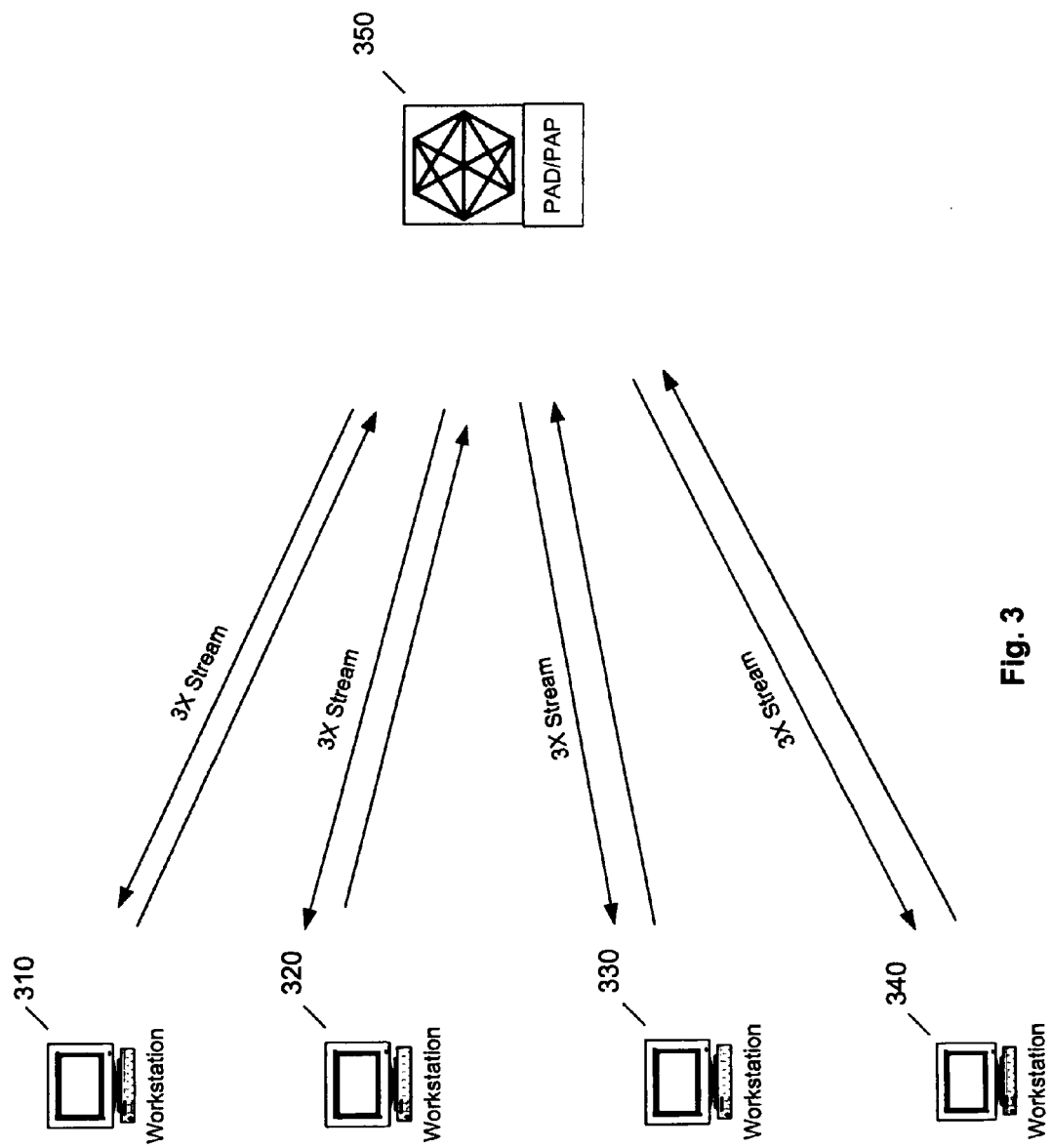
FIG. 3 is a diagram of a switch interfacing with four conferencing participants.

By way of introduction, FIGS. 1-3 illustrate aspects of a communications system that uses switching techniques to duplicate digital streams to enable conferencing between multiple participants. For brevity, in FIGS. 1-3, several elements are represented as monolithic entities. However, as would be understood by one skilled in the art, these elements each may include numerous interconnected computers and components configured to perform a set of specified operations and/or dedicated to a particular geographical region. FIGS. 4 and 5 illustrate aspects of a communications system that may or may not correspond to the logical and/or physical aspects described with respect to FIGS. 1-3.

Referring to FIG. 1, a communications system 100 that is capable of providing conferencing between multiple participants may be structured and arranged to include two or more conferencing participants 150A and 150B and communication software and hardware that enables communications between them. More particularly, the communications system 100 may include a transmitting participant 110 (optional), a network 120, a switch 130, a conference manager 135 (optional), a network 140, and conferencing participants 150A and 150B. A conferencing participant 150A generally transmits one or more streamed data units across network 120 to one or more switches 130 that duplicate the data units or portions of the data units and transmit the duplicated data units or portions to the two or more conferencing participants 150A and 150B through network 140.

A transmitting participant 110 typically includes a computer system that converts a media feed into a stream. Transmitting participant 110 may be structured and arranged to convert the media source (e.g., a video or audio feed) into data units for transmission across a network 120. The transmitting participant 110 may include a general-purpose computer having a central processor unit (CPU) and memory/storage devices that store data and various programs such as an operating system and one or more application programs. Other examples of a transmitting participant 110 include a workstation, a server, a device, a special purpose device or component, a broadcast system, other equipment, or some combination thereof capable of responding to and executing instructions in a defined manner. The transmitting participant 110 also typically includes an input/output (I/O) device (e.g., one or more devices having a video and/or audio input and conversion capability), and peripheral equipment such as a communications card or device (e.g., a modem or a network adapter) for exchanging data with the network 120.

A communications link 115 is used to communicate data between the transmitting participant 110 and the network 120. Communications link 115 may include, for example, a telephone line, a wireless network link, a cable network, or a direct connection.

The network 120 typically includes hardware and/or software capable of enabling direct or indirect communications between the transmitting participant 110 and the switch 130. The network 120 may include a direct link between the transmitting participant 110 and the switch 130, or it may include one or more networks or subnetworks between them (not explicitly shown). Each network or subnetwork may include, for example, a wired or wireless data pathway capable of carrying and receiving data. Examples of network 120 include the Internet, the World Wide Web, a WAN ("Wide Area Network"), a LAN ("Local Area Network"), an analog or a digital wired or wireless telephone network (e.g., a PSTN ("Public Switched Telephone Network"), an ISDN ("Integrated Services Digital Network"), or a xDSL ("any form of Digital Subscriber Loop")), and/or a radio network, a television network, a cable network, a satellite network, or some other delivery mechanism for carrying data.

The switch 130 typically is structured and arranged to receive streams of data units (e.g., from the transmitting participant 110 and the conferencing participants 150A and 150B), to duplicate the stream of data units, and to transmit the duplicated streams to two or more conferencing participants 150A and 150B.

In some implementations, the switch 130 is structured and arranged to perform filtering and forwarding between different domains at the same level of the protocol stack in the OSI ("Open System Interconnection") reference model. For example, in some networks, switch 130 may forward Ethernet frames between different Ethernet segments. In another example, switch 130 may forward IP packets between different IP subnets.

Generally, switch 130 includes a device that performs network operations and functions in hardware (e.g., a chip or a part of chip). In some implementations, the device may include an ASIC ("Application Specific Integrated Circuit") that implements network operations logic directly on a chip (e.g., logical gates fabricated on a silicon wafer then manufactured into a chip). For example, an ASIC chip may implement a logical gate structure in silicon to perform filtering by receiving a packet, examining the IP address of the received packet, and filtering based on the IP address.

Implementations of the device included in the switch 130 may use a Field Programmable Gate Array (FPGA). A FPGA is generally defined as including a chip or chips fabricated to allow third party designers to implement a variety of logical designs on the chip. For example, a third party designer may load a design within a FPGA to replace the received IP addresses with different IP addresses, or may load a design within the FPGA to segment and reassemble IP packets as they are modified while being transmitted through different networks.

Implementations of the device included in the switch 130 may include a network processor. A network processor generally is defined to include a chip or chips for allowing software to specify network operations to be performed. A network processor may perform a variety of operations. One example of a network processor may include several interconnected RISC ("Reduced Instruction Set Computer") processors fabricated in a network processor chip. The network processor chip may implement software on some of the RISC processors to change an IP address of an IP packet. Other RISC processors in the network processor chip may implement software that determines which conferencing participants are receiving an IP stream.

Although various examples of network operations were defined with respect to different devices, each of the devices may to be programmable and capable of performing the operations of the other devices. For example, the FPGA device is described as the device used to replace IP addresses and segment and reassemble packets; however, a network processor and ASIC are generally capable of performing the same operations.

Data units handled by switch 130 may be accessed by or sent to conferencing participants 150A and 150B through network 140. As such, network 140 is structured and arranged to receive data units transmitted from the switch 130 for transmission to the conferencing participants 150.

The conference manager 135 may include one or more devices capable of enabling an electronic conference of two or more conferencing participants. The conference manager 135 may include a controller (not shown) that processes instructions received from or generated by a software application, a program, a piece of code, a device, a computer, a computer system, or a combination thereof, to direct operations of the conference manager 135. The instructions may be embodied permanently or temporarily in any type of machine, component, equipment, storage medium, or propagated signal that is capable of being delivered to the conference manager 135 or that may reside with the controller at the conference manager 135. The conference manager 135 may include a general-purpose computer (e.g., a personal computer) capable of responding to and executing instructions in a defined manner, a system or a component in the switch 130, other equipment, or some combination of these items that is capable of responding to and executing instructions.

For instance, in one implementation, the conference manager 135 includes one or more scheduling, management, and authentication applications (e.g., calendaring software) capable of establishing and managing one or more electronic conferences. These scheduling and authentication applications may run on a general purpose operating system and a hardware platform that includes a general purpose processor and specialized hardware for graphics, communications and/or other capabilities. In another implementation, conference manager 135 may include a switch designation component (e.g., a server or program) that determines the switch 130 with which the conferencing participants will be communicating. For example, the conference manager 135 may be structured and arranged to communicate to the conferencing participants which specific switch will host the conference (e.g., duplicate and transmit the streams of data units), or to communicate to the designated switch the required information and authorization to host the conference.

Implementations of the conference manager 135 may include a service provider or a conference organizer. For example, a service provider may offer conferencing services and arrange or set up conferences. In another example, a conference organizer (e.g., a user putting together an electronic conference) may act both as a conference manager 135 and a conferencing participant 150B.

The network 140 may include hardware and/or software capable of enabling direct or indirect communications between the switch 130 and the conferencing participant 150. As such, the network 140 may include a direct link between the switch 130 and the conferencing participant 150, or it may include one or more networks or subnetworks between them (not shown). Each network or subnetwork may include, for example, a wired or wireless data pathway capable of carrying and receiving data. Examples of the delivery network include the Internet, the World Wide Web, WANs, LANs, analog or digital wired and wireless telephone networks (e.g., PSTN, ISDN, or xDSL), radio, television, cable, satellite, and/or any other delivery mechanism for carrying data. Network 120 and network 140 may share one or more hardware or software devices.

Conferencing participants 150A and 150B may include one or more devices capable of receiving the streams of data units transmitted by switch 130 through network 140. The conferencing participant 150A may include a controller (not shown) that processes instructions received from or generated by a software application, a program, a piece of code, a device, a computer, a computer system, or a combination thereof, to direct operations of the conferencing participant 150A. The instructions may be embodied permanently or temporarily in any type of machine, component, equipment, storage medium, or propagated signal that is capable of being delivered to the conferencing participant 150A or that may reside with the controller at the conferencing participant 150. The conferencing participant 150 may include a general-purpose computer (e.g., a personal computer) capable of responding to and executing instructions in a defined manner, a workstation, a laptop, a PDA ("Personal Digital Assistant"), a wireless phone, a component, other equipment, or some combination of these items that is capable of responding to and executing instructions.

For instance, in one implementation, the conferencing participant 150A includes one or more information retrieval software applications (e.g., a browser, a mail application, an instant messaging client, an Internet service provider client, or an AOL TV or other integrated client) capable of receiving one or more data units. The information retrieval applications may run on a general purpose operating system and a hardware platform that includes a general purpose processor and specialized hardware for graphics, communications and/or other capabilities. In another implementation, conferencing participant 150A may include a wireless telephone running a micro-browser application on a reduced operating system with general purpose and specialized hardware capable of operating in mobile environments.

Generally, conferencing participant 150A participates in an electronic conference by transmitting and receiving streams of data units. However, implementations may include having conferencing participants 150A participate in an asynchronous mode. For example, an electronic conference may incorporate a news feed that is being discussed and transmitted by a transmitting participant. In another example, a briefing may be incorporated into an electronic conference to enable wider participation. Other asynchronous modes may include conferencing participants that receive but do not transmit. For these and other reasons, aspects of the transmitting participant 110 may resemble, but are not limited to, aspects of the conferencing participant 150A.

Conferencing participant 150B may include a workstation that is identical to conferencing participant 150A, or conferencing participant 150B may include a device that differs from conferencing participant 150A. For example, conferencing participant 150A may include a PDA while conferencing participant 150B includes a workstation.

In another implementation, the conferencing participants 150A and 150B may have different input/output capabilities. For example, one conferencing participant 150A may not have a camera from which to generate video content. This may limit the conferencing participant 150A to only sending an audio stream of data units. In another implementation, the conferencing participant 150A may have limited graphical display capabilities (e.g., the conferencing participant may be a PDA). The conferencing participant 150A may receive text messages exchanged as part of the electronic conference without receiving video content.

FIG. 2A illustrates conferencing applications 200A that are available to an exemplary conferencing participant, such as the conferencing participant 150A described in FIG. 1. The applications depicted include video conferencing application 210A, image conferencing application 220A, audio conferencing application 230A, and text conferencing application 240A.

In general, the conferencing applications 200A are logically organized from the top of the diagram down based on the resources required by those applications. For example, video conferencing applications 210A generally require more bandwidth than text conferencing applications 240A. Similarly, the computational resources required by the image and audio compression techniques to compress, decompress and/or display media generally decrease from video conferencing applications 210A to image conferencing applications 220A to audio conferencing applications 230A to text conferencing applications 240A. The resources required for one or more applications may lead one or more conferencing participants to participate in a less resource-intensive manner.

Typically, video conferencing application 210A encodes and displays audio and video content. Implementations of video conferencing application 210A use compression to reduce the bandwidth consumed by transmitting the stream of data units. For example, video conferencing protocols and techniques may reduce the resolution, detail, or frame rate to reduce the bandwidth consumed. In another example, the frame-to-frame differences may be encoded for transmission instead of encoding each frame. Similar techniques may be applied to the audio signal. For example, the sampling rate of the audio signal may be reduced or the signal may be compressed.

Image conferencing application 220A typically operates by displaying one or more images to conferencing participants. Although an image conferencing application may resemble, in some implementations, a video conferencing application 210A with a low frame rate, image conferencing application 220A typically has non-video implementations. For example, a conferencing participant may input a map into an electronic conference in which aspects of the map are discussed. Other implementations may include inputting a web page and/or a slide show for incorporation into the electronic conference. In an implementation that resembles video conferencing application 210A, an image of the conferencing participant may be displayed in an audio conference when that conferencing participant is speaking.

Audio conferencing application 230A involves the use of an audio signal (e.g., a stream of data units) for incorporation into an electronic conference. Typically, aspects of the audio conferencing application may resemble aspects of the audio signal in a video conferencing application 210A discussed above in that the signal may be compressed.

Text conferencing application 240A involves the exchange of text in an electronic conference. One common form of exchanging text may feature the use of "chat" (e.g., a "chat room"). Other text exchanging applications may include electronic mail, instant messaging, SMS ("Short Message Service"), and proprietary applications. Although some of the text exchanging applications may not commonly appear as text conferencing applications 240A, implementations may include using an underlying text exchanging application as a transport mechanism in the conferencing application. For example, an electronic conference may use electronic mail to exchange text messages between conferencing participants. In another example, when one conferencing participant receives an instant message from another conferencing participant, the instant message may be incorporated into the electronic conference.

FIG. 2B illustrates one implementation for user environment 200B that indicates how several of the applications described with respect to FIG. 2A may be collectively integrated into and form one or more electronic conferencing applications. Typically, user environment 200B operates on a computer system, such as the conferencing participant 150A described with respect to FIG. 1. User environment 200B may be structured and arranged to incorporate video, images, text and audio as part of an electronic conference as well as to share a common application or white board. Specifically, user environment 200B includes video application 210B, image application 220B, audio conferencing application 230B, text conferencing application 240B, and shared application 250B.

Typically, video application 210B features the display of two other conferencing participants. In one implementation, each conferencing participant has related text and audio conferencing applications, and the first conferencing participant may be represented by a video conferencing application 212B, an audio conferencing application 232B, and a text conferencing application 242B. The second conferencing participant communicates with a video application 214B, an audio conferencing application 234B, and a text conferencing application 244B. A third conferencing participant without video conferencing capability may communicate using an imaging application 220B, an audio conferencing application 236B, and a text conferencing application 246B.

The audio conferencing application 230B depicts an implementation reflecting both common audio properties as well as properties specific to their originating sources. More precisely, general audio sources generated simultaneously may cause destructive interference that make them difficult to understand. For this reason, the audio channel may be structured so that one audio channel is broadcast at a time. For example, implementations may commonly manage all audio conferencing applications and apply the same operating instructions to all received audio signals. In one example, receiving several different audio sources simultaneously may cause user confusion or comprehension difficulties that may be avoided through the application of filtering criteria generic to several users. Alternatively, it may be desirable to provide source-specific operating and/or filtering instructions. For example, where the different audio signals are received at different strengths, the conferencing participant may wish to reduce the volume from one conferencing participant and increase the volume from another conferencing participant. In another implementation, a conferencing participant may wish to listen to everything from the conferencing participant in the audio conferencing application 232B and "mute" or suppress the audio conferencing application 234B. Each function may be enabled through filtering controls displayed in user environment 200B.

A text conferencing application 240B may be a common application to all participants (as represented by the application appearing across the breadth of participants) or may be specific to conferencing participants (as represented by text conferencing applications 242B, 244B, and 246B. In one implementation of text conferencing as a common application to all participants, when a conferencing participant enters a message to be communicated, the participant's identification may appear next to the message. In implementations of conferencing participant-specific text conferencing, the message may be displayed in association with its source (e.g., underneath the corresponding participant).

FIG. 3 illustrates the operation of a switch in interfacing with four conferencing participants to duplicate a stream of data units. Conferencing participants 310, 320, 330 and 340 each generally correspond to the conferencing participants described with respect to FIGS. 1 and 2B, and switch 350 generally corresponds to the switch 130 described with respect to FIG. 1.

Each of conferencing participant 310, 320, 330, and 340 transmits one stream of data units to the switch 350 for duplication, and receives the duplicated streams of the other participants in return from the switch 350. When each conferencing participant receives the stream of data units of all the other conferencing participants, the total number of streams sent out by the switch is 2(N−1), where N is the number of conferencing participants (i.e., the switch sends out six streams when there are four participants). Although FIG. 3 illustrates having each conferencing participant receive the stream of every other conferencing participant, some implementations, particularly those having a large number of conferencing participants, may use intelligent selection and filtering techniques to reduce the number of streams that are transmitted to each participant.

Furthermore, although one switch is depicted, implementations may include using more than one switch. For example, several users may initiate an electronic conference at one switch. However, as additional users join the electronic conference, additional switches may be added to support the electronic conference. More specifically, in one implementation, a first switch with limited available capacity may initiate a connection to a second switch and send all new connections to the second switch. Initiating the connection to the second switch may include exchanging duplicated data units between the first and second switches. In another example, when the second switch is activated, several users may be transferred to the second switch to be hosted. Implementations also may include intelligent switch selection criteria that activate use of a second switch. For example, when the switch determines that several users are located in the same proximity, the switch may activate an additional switch that is closer to the users to host the conference so that duplicated streams are not being transmitted across large portions of the network.

FIG. 4 illustrates the operation of a communications system that uses a switch to duplicate at least a subportion of a stream of data units and enable conferencing participants to access the duplicated subportion of the stream of data units. The communications system includes a conference manager 401, a switch 402, and several conferencing participants 403-406.

The conference manager 401 generally initiates the conference (step 410) by, for instance, determining the identity of a switch to host the conference and enabling the switch to host the conference for two or more terminals. The conference may be initiated in response to a request from a conferencing participant to host the conference. The conference may be initiated by allocating switch resources and authenticating conferencing participants. Allocating switch resources may include load balancing conferencing participants among more than one switch to reduce network/switch congestion. Conferencing participants seeking to join an electronic conference being hosted on a switch may be authenticated to ensure conference confidentiality through a login process or through a more elaborate set of steps, such as the exchanging of public and/or private keys.

The request to initiate the conference is received by switch 402 (step 412), which also may verify and authenticate the message (not shown). In response to the request, the switch 402 establishes the conference (step 413). Although the conference is established in response to a request from a conference manager, in some configurations, the conference manager may reside on a conferencing participant. In any event, the switch 402 establishes a conference with conferencing participants 403-406 (step 414). Establishing the connection generally enables a conferencing participant to communicate a stream of data units to other conferencing participants through the switch 402 and to receive streams of data units from one or more other conferencing participants through the switch 402.

Terminal 403 transmits a stream of data units (step 416) that is received by the switch 402 (step 418). The switch duplicates the stream of data units (step 420). In general, duplicating the stream of data units includes receiving a data unit, identifying a payload portion within the data unit, enabling an instance of the payload to be modified for subsequent transmission, and adding header information to the data unit to reflect addressing information corresponding to one or more recipients (e.g., conferencing participants 403-406). The stream may be duplicated by copying the payload (e.g., content) of an IP packet and changing the header information to reflect the IP address of the destination conferencing participants for the payload, by storing one or more IP packets for modification (e.g., the IP packet may be stored), by loading the packet to memory and changing the IP destination address while preserving other parameters in the header, or by other techniques. Operations may be performed on the payload before transmitting the payload to a conferencing participant. For example, the switch may transcode the content of the payload to reduce the bit rate of the stream. Generally, transcoding involves modifying a compressed signal so that the characteristics of the modified signal correspond to specified criteria. For example, a high bit rate video signal may be transcoded by having the compressed video signal expanded, and recompressed at a higher compression ratio before transmitting the recompressed signal to a conferencing participant.

Another operation that may be performed includes partitioning a combined signal to extract a forwarded signal and remove a filtered signal. For example, a switch may remove an audio signal from a combined audio-visual signal to reduce the bandwidth required to transmit the forwarded signal.

Although FIG. 4 illustrates having terminals 403-406 receive a transcoded and partitioned stream in steps 440-450, the diversity of partitioning techniques is intended to demonstrate that various forms of partitioning are available rather than how a conferencing participant would likely transition between different conferencing applications. For example, a terminal that is capable of receiving higher rate video applications would not likely request to "downgrade" the received signal and received text instead. Similarly, a conferencing participant capable of receiving video generally would not elect to receive audio or lower rate video instead.

In any event, regardless of the operations used during duplication of the payload portion, the switch 402 ultimately transmits the duplicated streams to conferencing participants 404-406 (step 422), and the conferencing participants 404-406 ultimately receive the stream of data units (step 424).

As part of participating in the electronic conference, terminal 404 transmits a stream of data units (step 426). The switch 402 receives (step 428) and duplicates (step 430) the stream of data units, and then transmits (step 432) the duplicated streams of data units which are received (step 434) by the conferencing participants 403, 405 and 406.

As the third participant to transmit in an electronic conference, terminal 405 transmits a stream of data units (step 435) that are received (step 436) by switch 402. The switch 402 performs operations on the data units. First, the switch 402 transcodes the data units (step 438). Typically, transcoding the data units involves modifying the content portion or underlying media format of a data unit to give the stream of data units a desired characteristic. For example, lower quality video may be decompressed and recompressed at a higher data rate with more detail and resolution. In another example, the data rate may be reduced by reducing the number of frames, and resolution, and/or by using a lossier compression algorithm.

Next the switch 402 extracts or partitions content from within the stream of data units (step 440) by, for example, filtering a signal from a stream of data units whose content combines more than one type of media (e.g., another signal). In this manner, an audio signal may be extracted from a composite audio-video signal.

Although FIG. 4 depicts transcoding as occurring before partitioning, implementations may include performing those and other steps in reverse order or simultaneously, or combining them with other steps. For example, a stream of data units may have the content of the received stream of data units expanded, and then may extract the audio signal from the expanded stream.

The stream of data units is transmitted to terminals 403, 404, and 406 (step 442) in one or several formats. Additionally, the transmitted data units may be received in various formats based on the terminal to which they are transmitted. For instance, terminal 403 may receive or filter an audio stream of data units where the audio portion of a video signal has been partitioned (step 446), terminal 404 may receive or filter a lower bit rate video that has been transcoded (step 448), and terminal 406 may receive or filter text that has been partitioned and an image that has been transcoded from the underlying stream of data units (step 450).

Although a conferencing participant may receive output streams of data units from several sources concurrently (e.g., using several displays on one or more display devices), the conferencing participant may selectively receive and/or display a subset of the multiple streams at any given instant. For example, limited bandwidth to the conferencing participant may constrain the number of simultaneous connections, or comprehension issues may undermine the advantages otherwise obtained by receiving more than one stream at a time. In an example of seven conferencing participants, it may be advantageous to transmit data streams from only four of the seven conferencing participants to the conferencing participant to avoid bandwidth constraints or to avoid confusing the recipient conferencing participant.

It may therefore become necessary to prioritize among several competing or simultaneous data streams. For example, access to the streams of data units may be limited to the conference manager's stream and also those of the three most recent "active" participants. A conferencing participant may be considered "active" when the participant attempts to transmit during the electronic conference by, for instance, speaking into a microphone, moving while on camera, or typing text in a chat window.

FIG. 5 illustrates prioritization in an electronic conferencing system that includes conferencing participants 501-503, a conference manager 504, and a conferencing participant 508. Conferencing participants 501-503 each transmit streams of data units concurrently, while conferencing participant 508 determines which of the streams of data units to "watch" or otherwise perceive.

In this example, conferencing participant 501 is talking initially (step 510). In response, conferencing participant 508 perceives conferencing participant 501 (step 512).

If, in the course of the electronic conference, conferencing participant 502 begins talking (step 514), conferencing participant 508 stops perceiving conferencing participant 501 (step 516) and begins perceiving conferencing participant 502 (step 518). When conferencing participant 501 begins talking again (step 520), conferencing participant 508 stops perceiving conferencing participant 502 (step 522) and begins perceiving conferencing participant 501 (step 524) due to the fact that there is a new "active" participant.

When a conferencing participant 503 is designated as having a lower priority than the conference participant currently being broadcast/perceived, other conferencing participants disregard communications by that conferencing participant, as illustrated by conferencing participant 508 disregarding communications by conferencing participant 503 while higher-priority conferencing participant 501 is being perceived (steps 526 and 528).

Participant prioritization may be implemented by network-centric techniques or by conferencing participant-centric techniques. For example, in a network-centric prioritization, the switch may assign users different priorities designated by, for example, conference manager 504. This prioritization may be forwarded by a conferencing participant to the switch, which will selectively duplicate and enable access to (e.g., transmit) subportions of the stream of data units. If conflicts exist in priorities, the conference organizer's priorities may take precedence.

In a participant-centric technique, the receiving device may determine which streams of data units the switches should filter out. For example, the conferencing participant may elect to always receive the stream of data units of a specified conferencing participant. In yet another example, the conferencing participant may receive filtering or prioritization parameters from a conference manager 504.

To illustrate prioritization based at the conference manager 504, the conference manager 504 enables priority for conferencing participant 502 when conferencing participant 501 is transmitting (step 530). Conferencing participant 502 receives the priority to transmit and have its stream duplicated before other conferencing participants (step 532). In one implementation, the switch may receive a prioritization message and selectively duplicate streams, or may forward the prioritization message to conferencing participants to allow the participants to selectively filter signals. In another implementation, the conference manager 504 may direct a prioritization message to conferencing participants without using the switch to replicate the message. In yet another example, the conference manager 504 may contact the transmitting conferencing participant (e.g., conferencing participant 501) and direct that participant to stop transmitting.

Regardless of the prioritization systems used, conferencing participant 502 begins talking (step 534). In response, conferencing participant 508 stops perceiving conferencing participant 501 (step 536) and starts perceiving conferencing participant 502 (step 538). Even though conferencing participant 502 receives a priority designation, conferencing participant 501 begins talking (step 540). However, because conferencing participant 502 has been designated to be a higher priority than conferencing participant 501, conferencing participant 508 disregards conferencing participant 501 (step 542).

Other implementations are within the scope of the following claims. In particular, in some implementations, the switch may perform one or more of the functions performed by the conference manager. The switch, conferencing participants, and networks also may be distributed across different entities in the communications system and may make use of one or more agents and/or proxies to perform certain functions. For example, the switch may receive a forwarded list of conferencing requirements from a server that arranges electronic conferences to be hosted on one or more switches.

In one example, the conference may be launched by existing applications. For example, a user may be participating in a chat room. One of the users may propose a chat by entering a URL ("Uniform Resource Locator") that is launched by the users clicking on the URL. For example, the URL may contain a hyperlink to conference ID#10 on duplicating switch on IP address A.B.C.D. Launching the URL 'connects' the terminal to the duplicating switch. Upon receiving the URL request from the terminal, the duplicating switch may then look up ID#10 and determine that stream IDs 10-14 are associated with ID#10 and transmit those streams to the requesting terminal. The duplicating switch also may receive stream ID 15 from the requesting terminal and send stream ID 15 to other participants in conference ID#10.

What is claimed is:

1. A method comprising:
  receiving, at a switch, a first data unit from a first conferencing participant, the first data unit including a payload portion and a first address portion;
  forwarding, by the switch, the first data unit to at least a second conferencing participant and a third conferencing participant by:
    generating, using one or more processors at the switch, a first and a second duplicated data unit by:
      duplicating at least a portion of the payload portion and the first address portion of the first data unit; and
      changing an IP destination address in an IP header of the duplicated first address portion to reflect destination address information; and
    sending the first duplicated data unit to the second conferencing participant and sending the second duplicated data units to the third conferencing participant;
  receiving, at the switch, a second data unit from the second conferencing participant; and
  forwarding, by the switch, the second data unit to at least the first conferencing participant and the third conferencing participant.

2. The method of claim 1, wherein the first data unit includes an Internet Protocol packet.

3. The method of claim 2, wherein:
  duplicating at least a portion of the payload portion of the first data unit includes copying the payload portion of the Internet Protocol packet; and
  changing an IP destination address in an IP header of the duplicated first address portion includes adding an Internet Protocol address of the second or third conferencing participant as part of the IP header.

4. The method of claim 1, wherein duplicating at least a portion of the payload portion and the first address portion of the first data unit includes duplicating the entire payload portion of the first data unit.

5. The method of claim 1, wherein the first data unit is addressed to a unicast address of the switch.

6. The method of claim 1, wherein changing an IP destination address in an IP header of the duplicated first address portion includes adding a unicast address of the second or third conferencing participant.

7. The method of claim 1, wherein forwarding the first data unit further includes: filtering an originating stream of data units from an originating conferencing participant so that a data unit included in the originating stream is not transmitted back to the originating conferencing participant.

8. The method of claim 1, wherein duplicating at least a portion of the payload portion and the first address portion of the first data unit includes trans coding an underlying media format of the first data unit to a different bit rate.

9. The method of claim 1, further comprising determining whether one of the second conferencing component or the third conferencing component is attempting to actively participate.

10. The method of claim 9, wherein forwarding the first data unit includes forwarding the first data unit to the conferencing participant attempting to actively participate.

11. The method of claim 9, wherein the first data unit is not forwarded to conferencing participants that have not been attempting to actively participate.

12. The method of claim 1, wherein forwarding the first data unit comprises using a conference manager to designate which of the conferencing participants the first data unit is forwarded to.

13. The method of claim 1, wherein changing an IP destination address in an IP header of the duplicated first address portion comprises modifying a destination address of the first data unit to specify an address of the second or third conferencing participant.

14. The method of claim 1, wherein changing an IP destination address in an IP header of the duplicated first address portion comprises replacing a destination address of the first data unit to specify an address of the second or third conferencing participant.

15. The method of claim 1, wherein changing an IP destination address in an IP header of the duplicated first address portion comprises adding a new IP header with destination information of the second or third conferencing participant.

16. A method comprising:
- receiving a first datagram from a first conference terminal, the datagram including at least a payload portion and a first attribute portion;
- duplicating, using at least one processor, the payload portion of the datagram by duplicating the payload portion and the first attribute portion;
- generating, using the at least one processor, a second attribute portion for a second conference terminal by changing an IP destination address in the IP header of the duplicated first attribute portion;
- generating a third attribute portion for a third conference terminal;
- associating the second attribute portion with the duplicated payload portion to generate a second datagram;
- associating the third attribute data portion with the duplicated payload to generate a third datagram; and
- enabling access to the second datagram by the second conference terminal and enabling access to the third datagram by the third conference terminal.

17. The method of claim 16, wherein the first attribute portion of the datagram specifies one or more pieces of information included in layer three of the OSI ("Open System Interconnection") reference model.

18. The method of claim 16, further comprising modifying content of the payload portion of the second datagram.

19. The method of claim 16, wherein changing the IP destination address includes changing the IP destination address to an IP address corresponding to the second conference terminal or the third conference terminal, to which access to the payload portion will be enabled.

20. The method of claim 16, wherein a destination address in the second attribute portion is different from a destination address in the third attribute portion.

21. The method of claim 16, wherein the step of enabling further comprises: forwarding the second datagram to the second conference terminal; and forwarding the third datagram to the third conference terminal.

* * * * *